United States Patent [19]

Koch

[11] Patent Number: 4,803,905

[45] Date of Patent: Feb. 14, 1989

[54] METHOD AND APPARATUS FOR CUTTING COLUMNAR ARTICLES

[75] Inventor: Rainer Koch, Senden, Fed. Rep. of Germany

[73] Assignee: Lingl GmbH & Co. KG, Neu-Ulm, Fed. Rep. of Germany

[21] Appl. No.: 111,740

[22] Filed: Oct. 23, 1987

[30] Foreign Application Priority Data

Oct. 25, 1986 [DE] Fed. Rep. of Germany ....... 3636375

[51] Int. Cl.$^4$ .......................... B26D 5/00; B28B 11/14
[52] U.S. Cl. ........................................ 83/13; 83/651.1
[58] Field of Search ............... 83/13, 168, 200.1, 542, 83/581.1, 597, 651.1, 759, 783, 771

[56] References Cited

U.S. PATENT DOCUMENTS

| | | | |
|---|---|---|---|
| 1,925,848 | 9/1933 | Rubin | 83/783 X |
| 2,895,514 | 7/1959 | Wright | 83/783 X |
| 3,805,651 | 4/1974 | Smorenburg | 83/651.1 X |
| 4,488,464 | 12/1984 | Rooke et al. | 83/651.1 X |
| 4,621,555 | 11/1986 | Hartmann | 83/651.1 X |
| 4,624,163 | 11/1986 | Grace | 83/651.1 X |

FOREIGN PATENT DOCUMENTS

| | | |
|---|---|---|
| 1584496 | 2/1970 | Fed. Rep. of Germany . |
| 2100819 | 5/1972 | Fed. Rep. of Germany . |
| 2220360 | 3/1973 | Fed. Rep. of Germany . |
| 2353085 | 4/1975 | Fed. Rep. of Germany . |
| 0827301 | 5/1981 | Switzerland . |

Primary Examiner—William L. Sikes
Assistant Examiner—Akm E. Ullah
Attorney, Agent, or Firm—Nixon & Vanderhye

[57] ABSTRACT

Method and apparatus for cutting columnar articles, such as uncured ceramic (i.e., therefore plastic) web-type columns (e.g., which may typically be cured to a hardened state and coated with catalyst to form a catalytic converter), includes a cutting wire tensioned between a pair of spaced locations situated on the exterior side of the column to be cut. One of the locations (and thus one end portion of the cutting wire) is in a fixed position relative to the column, while the other location (and thus the other end portion of the cutting wire) is orbitally movable around the column. The cutting wire cuts the column along a plane established by such orbital movement while the length of the cutting wire is simultaneously continually varied so as to impart a benificial rectilinear (e.g., "saw-type") motion thereto so as to assist in the column cutting operation. A cleaning device in wiping contact with the wire cleans the same by virtue of such rectilinear motion. It is also possible to incrementally advance the cutting wire from one of the locations towards the other location at periodic intervals (e.g., once per cutting cycle) so that "fresh" wire is constantly being supplied to the actual column cutting area.

40 Claims, 3 Drawing Sheets

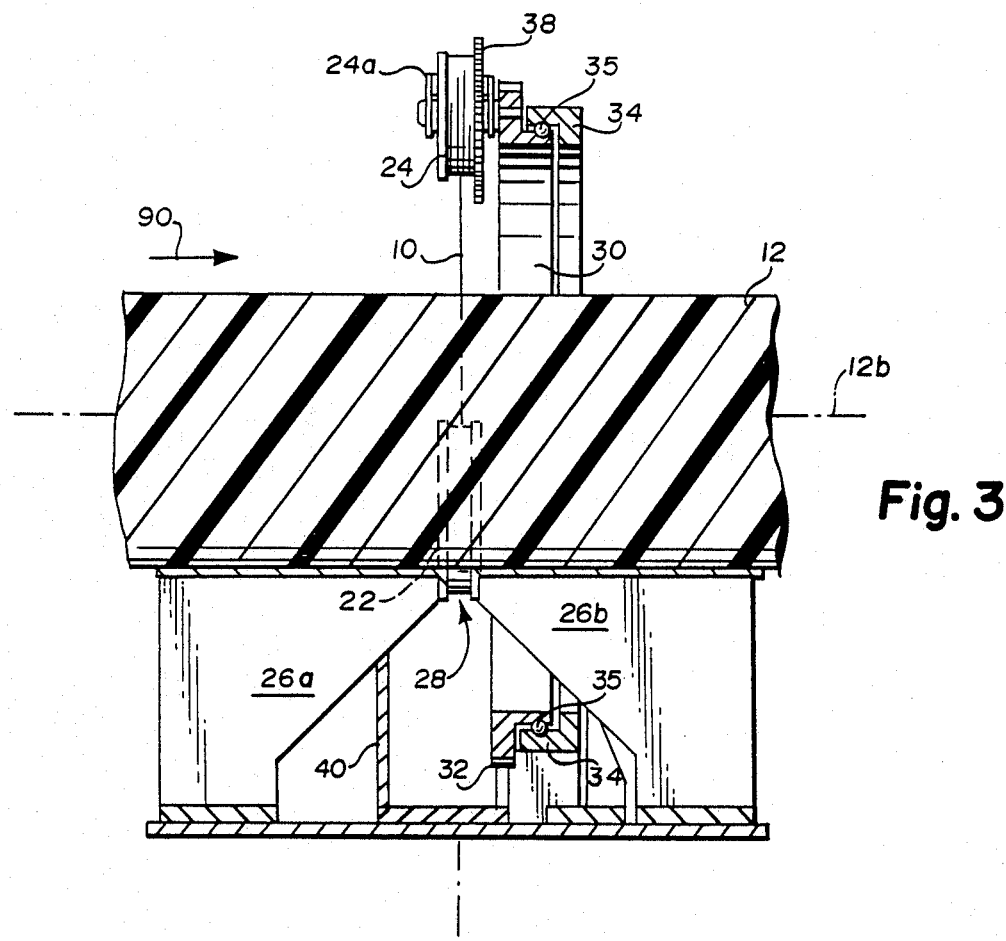
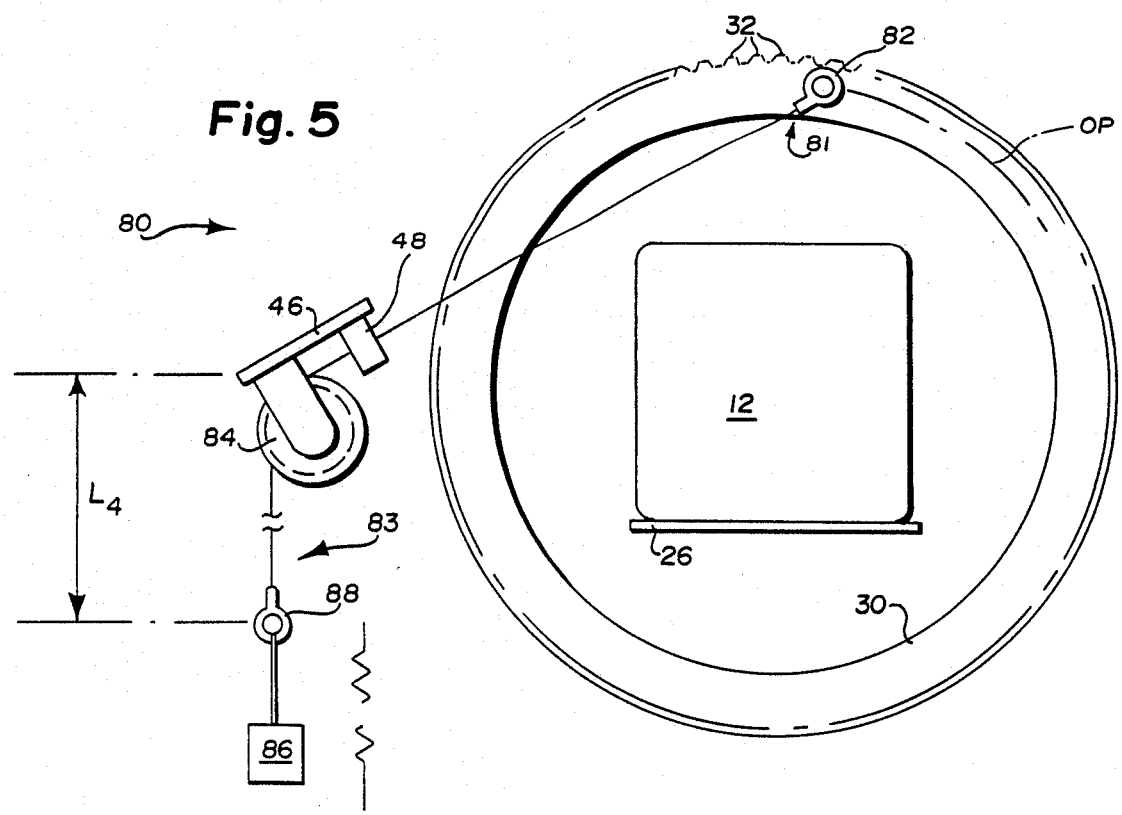

METHOD AND APPARATUS FOR CUTTING COLUMNAR ARTICLES

FIELD OF THE INVENTION

This invention generally relates to the cutting of columnar articles, for example, uncured ceramic (i.e., therefore plastic) web-type columns (e.g., which may typically be cured to a hardened state and coated with catalyst to form a catalytic converter). It includes method and apparatus whereby such columns may be cut along a predetermined plane (e.g., a plane transverse to the column's length) utilizing a cutting wire tensioned between a pair of spaced locations. According to the invention, orbital movement of one of such locations causes the wire to cut the column and, during such orbital movement, the length of the wire is simultaneously continually varied so as to achieve a beneficial reciprocal rectilinear (e.g., "saw-type") cutting action thereon.

BACKGROUND AND SUMMARY OF THE INVENTION

When cutting plastic columns and, particularly, columns used for the production of catalytic converters, it is essential that the cutting wire be guided in such a manner that the resulting cut edges of the column are as neat as possible. Since columns used for the production of catalytic converters are typically in the form of plastic webs (i.e., prior to curing to a hardened state), it is also important that, when cut, the columns are not crushed. Moreover, one feature which all successful column cutting devices must have is the capability of replacing cutting wires worn and/or damaged due to repeated cutting operations.

Devices which cut columnar articles are known, the most common of which cut the column either by means of horizontally strung wire(s) which may be passed vertically through the column, or by means of vertically strung wire(s) which may be passed horizontally through the column.

In German Offenlegungsschrift No. 2,353,085, a cutting device is described having a cutting wire fixed at both of its ends to the lateral strut of a vertically movable U-shaped frame. The cutting wire is tensioned outside the space reserved for the passage of the column by means of a tensioning device extended between an upper cross-bar of the frame and the cutting wire. The tensioning device thus exerts tension on the cutting wire at a location between the fixed ends of the wire so that the wire forms an angle with respect to an imaginary line extending between the wire's fixed ends.

A cutting device having multiple cutting wires held by a pivotally movable frame is disclosed in German Auslegeschrift No. 2,220,360. The cutting wires thus pivot in a downward direction so as to cut a column.

A cutting device is also described in German Offenlegungsschrift No. 1,584,496 wherein the cutting wires are strung horizontally between a pair of offset circular rings. The offset rings are mounted for rotation about respective parallel axes such that only one of the rings encompasses a column to be cut. Synchronous rotation of the two circular rings thus causes the cutting wires to pass vertically through the column (which moves parallel to the rotational axes of the rings) thereby cutting the same.

Cutting wires radially extending from the center of a circular ring-type wire guide are disclosed in German Auslegeschrift No. 2,100,819. The wire guide encloses a column to be cut while a support for the column is positioned laterally to the guide's rotational axis. The cutting wires are cleaned by means of wipers associated with each wire—the wipers being retained in a circular guideway whose center is offset relative to the rotational axis of the circular wire guide. Thus, upon rotation of the wire guide, each wiper will move circularly within the wiper guideway and, due to the off-center relationship between the wiper guideway and the wire guide, each wiper will also move longitudinally along its respective wire thereby cleaning the same.

All of these known cutting devices, however, are disadvantageous in that the movement of the cutting wire follows a vertical (or almost vertical) path relative to the column at the point of contact between the cutting wire(s) and the column. Thus, when used to cut uncured ceramic Web-type columns (such as those employed in the production of catalytic converters), such unidirectional movement of the cutting wire tends to cause the column to be crushed at the point of contact between the wire and the column thereby leading not only to imperfect or unacceptable cuts in the column, but also to premature wear of the cutting wires—i.e., the same section(s) of wire will repeatedly be exposed to abrasive wear. Another disadvantage which all these known devices have in common is that the worn wires can only be replenished by time-consuming procedures whereby the existing worn wires are physically removed and new wires are replaced. This obviously results in equipment down time and loss of production with the concomitant economic losses associated therewith.

According to the present invention, however, method and apparatus for cutting columnar articles (for example, plastic web-type columns typically employed in the production of catalytic converters) are provided whereby such columns may be cut along a predetermined plane (e.g., a plane transverse to the column's length) utilizing at least one cutting wire tensioned between a pair of spaced-apart locations situated to the exterior side of the column to be cut. Orbital movement of one of such locations, according to this invention, causes the wire to cut the column and, during such orbital movement, the length of the wire (i.e., situated between such locations) is simultaneously continually varied so as to achieve a beneficial reciprocal rectilinear (e.g., "saw-type") cutting action.

The present invention thus achieves bidirectional movement of the cutting wire—that is, the cutting wire is moved generally in a planar path through the column to be cut while also continually rectilinearly moving within such plane. This beneficial bidirectional cutting action of the present invention minimizes deformation of the column being cut since the "saw-type" cutting motion and movement of the cutting wire in a planar cutting path more easily accomplish cutting of the column as compared to undirectional cutting devices of the prior art. Moreover, since the length of the cutting wire is continually varied during the cutting operation, wear on the wire is more evenly distributed along its length thereby prolonging its useful life.

In a preferred form of the invention, the cutting wire is tensioned between a pair of spaced locations, which may be embodied in supply and take-up spools for the wire, respectively. One of the spools (e.g., the take-up spool) is mounted on an orbitally movable circular ring, while the other spool (e.g., the supply spool) is in a fixed-position relative to the column to be cut. Thus, as the movable spool is moved in its orbit around the column to be cut, the length of the wire will be continually varied due to the wire being "paid out" from the other spool. That is, during one segment of such orbital movement, the length of the wire between the two spools will vary between a shorter length $L_l$ to a longer length $L_2$ and then, during another segment of such orbital movement, the cutting wire length will return to length $L_l$ from length $L_2$.

The circular ring can be driven by any suitable means. Preferably, the ring is driven by means of a pinion gear intermeshed with the circular ring and operatively connected to a suitable power source (e.g., an electric motor).

It is also possible to incrementally advance the wire from the supply reel to the take-up reel at periodic intervals (e.g., once per cutting cycle). In this way, incremental lengths of "fresh" wire are constantly being supplied to the actual cutting area thus eliminating the need to shut down the production line while a worn cutting wire is replaced.

Other aspects and advantages of this invention will become more clear to the reader after careful consideration is given to the detailed description of the preferred exemplary embodiments thereof which follow.

BRIEF DESCRIPTION OF THE DRAWINGS

Reference will hereinafter be made to the accompanying drawings wherein like reference numerals throughout the various Figures denote like structural elements, and wherein;

FIG. 3 is a cross-sectional elevational view of the cutting device shown in FIG. 2 and taken along line 3—3 therein;

FIG. 5 is a schematic elevational view of another embodiment of the cutting device of this invention.

DETAILED DESCRIPTION OF THE PREFERRED EXEMPLARY EMBODIMENTS

Figure 1:
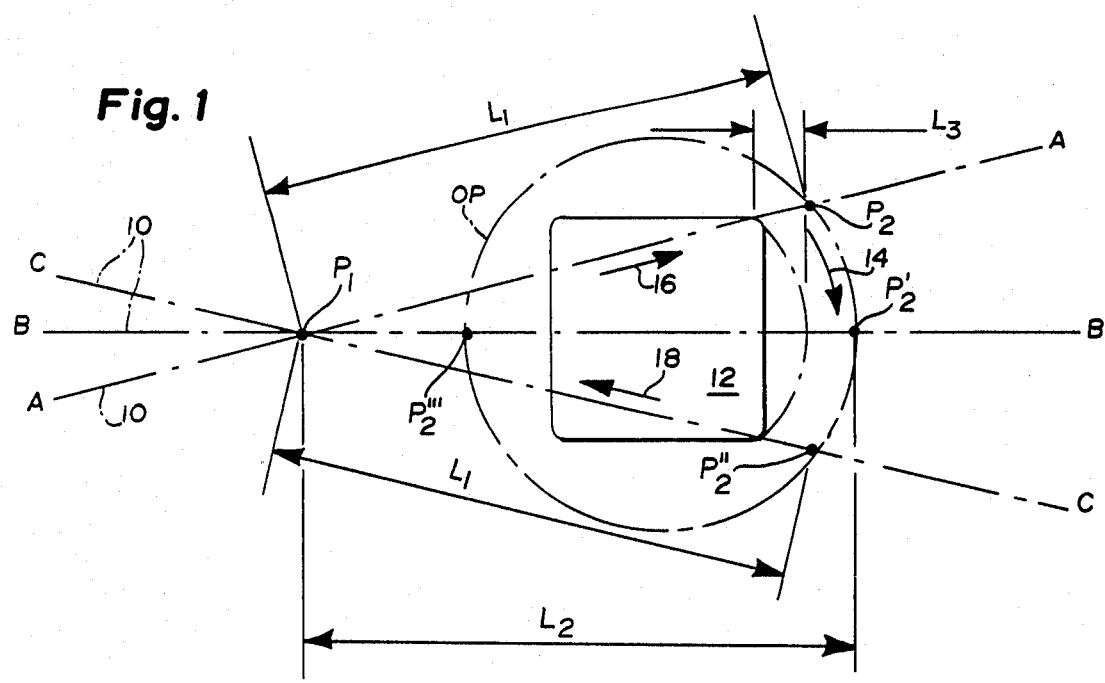
FIG. 1 is a schematic representation of the functional principles of this invention.

A representation of the functional aspects of this invention is shown in accompanying FIG. 1 which schematically depicts a cutting wire 10 in three positions A—A, B—B and C—C, respectively, during a cutting operation performed on a column 12. The cutting wire 10 is maintained under tension between two spaced-apart points $P_l$ and $P_2$ situated to the exterior side of column 12—point $P_l$ being in a fixed-position relative to column 12 while point $P_2$ is orbitally movable along path OP (as will be described in greater detail below). The path OP establishes the plane along which the cutting wire 10 will cut column 12. The cutting plane is preferably transverse to the longitudinal dimension of column 12 but may be skewed relative thereto, if desired.

As point $P_2$ orbitally moves from wire position A—A to wire position B—B in the direction of arrow 14, the length of cutting wire 10 is increased from length $L_l$ (as measured between points $P_l$ and $P_2$) to a greater length $L_2$ (as measured between points $P_l$ and $P'_2$) That is, the length of cutting wire 10 increases by an amount $L_3$. This increase in length thereby translates into rectilinear motion of the cutting wire 10 in the direction of arrow 16 during movement of wire 10 from position A—A to position B—B.

As the cutting wire 10 continues to move through its position B—B towards position C—C, the length of the cutting wire 10 will decrease from length $L_2$ (as measured between points $P_l$ and $P'_2$) to length $L_l$ (as measured between points $P_l$ and $P''_2$) That is, when cutting wire 10 moves from position B—B to position C—C, the length $L_2$ will decrease (by an amount of $L_3$) to a shorter length $L_l$. This decrease in length of cutting wire 10 thus serves to rectilinearly move the cutting wire 10 in the direction of arrow 18 during the wire's movement from position B—B to position C—C. Of course, further orbital movement of point $P_2$ beyond position C—C in the direction of arrow 14 causes further decrease in the length of cutting wire 10 until point $P'''_2$ is reached, beyond which the length of cutting wire 10 increases until point $P'_2$ is again reached. This continual increasing/decreasing of the length of cutting wire 10 beneficially moves cutting wire 10 in reciprocal rectilinear directions (arrows 16 and 18) simultaneously during orbital movement of point $P_2$ so as to perform a "saw-type" cutting action on column 12. Such a cutting action, together with the force component of the cutting wire within the plane established by the orbital movement of point $P_2$, assists wire 10 in more easily cutting column 12 as compared to conventional cutting devices.

Figure 2:
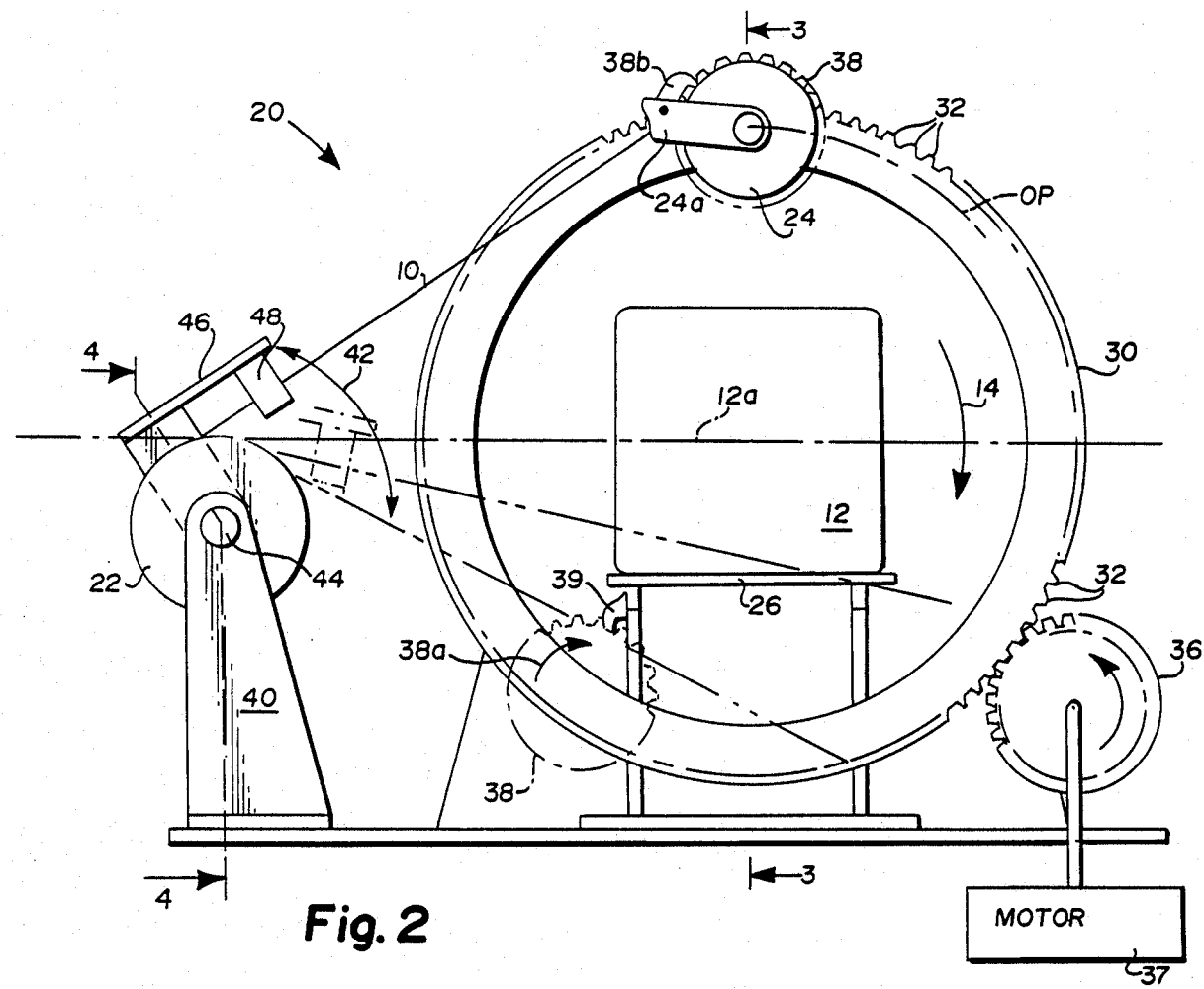
FIG. 2 is an elevational view of a preferred embodiment of the cutting device of this invention.
Figure 4:
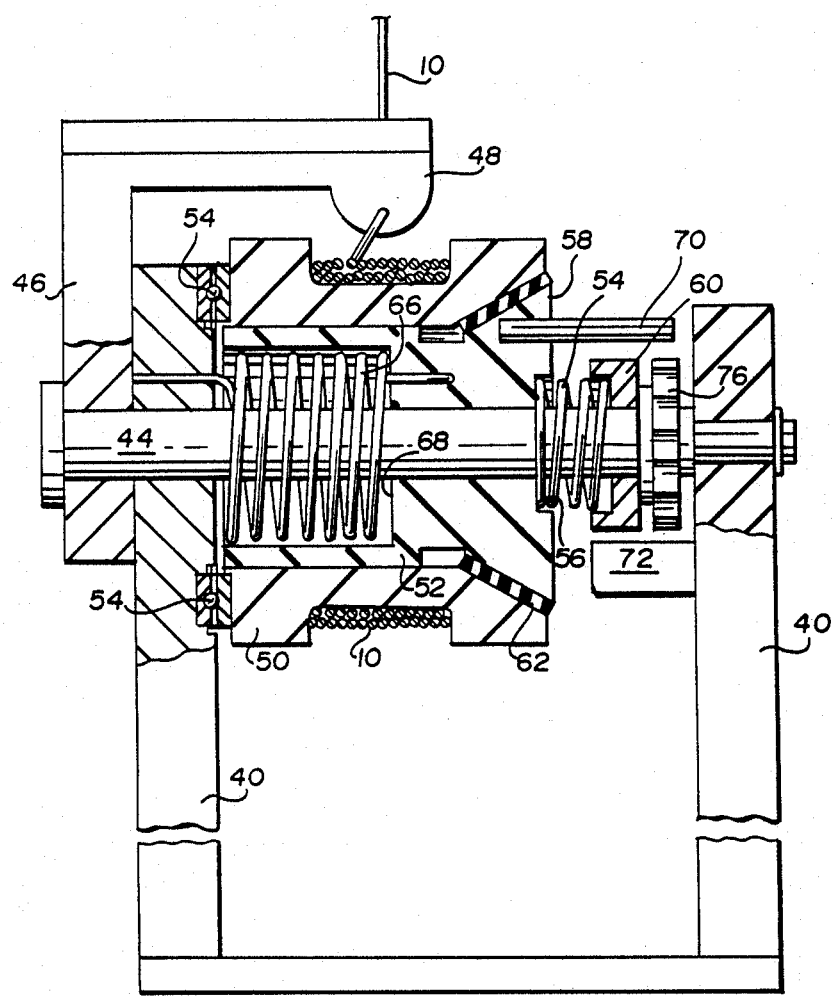
FIG. 4 is a cross-sectional elevational view of the supply spool of this invention taken along line 4—4 in FIG. 2.

FIGS. 2-4 show preferred structures to accomplish the functions of this invention described above with reference to FIG. 1. As ss seen, the device 20 includes a cutting wire 10 maintained under tension between a fixed-position supply spool 22 and an orbitally-movable take-up spool 24. A table 26 supports column 12 at a position whereby the horizontal longitudinal midplane 12a of column 12 coincides with position B—B shown in FIG. 1 (that is, passes through points $P_l$ and $P'_2$). Table 26 (as shown more clearly in FIG. 3), is comprised of a pair of supports 26a, 26b which defines a slot 28 therebetween through which the wire 10 will pass as spool 24 orbitally moves along path OP in the direction of arrow 14.

Take-up spool 24 is rotatably mounted to a circular ring 30 having gear teeth 32 defined on an exterior periphery thereof. The circular ring 30 is, in turn, mounted to a stationary ring 34 via suitable journal means (e.g. ball bearings 35) for orbital movement about the longitudinal axis 12b (situated within longitudinal midplane 12a) of column 12. The take-up spool 24 also carries a wire guide 24a so as to assist in the winding and unwinding of wire 10 onto and from spool 24, respectively. A pinion gear 36 is intermeshed with the teeth 32 of ring 30 and is driven via suitable motor means 37 so as to rotate ring 30 about axis 12b in the direction of arrow 14 thereby, in turn, causing spool 24 to orbitally move around column 12 along path OP.

Take-up spool 24 also includes a ratchet wheel 38 which engages with arm 39 (rigidly associated with table 26) each time spool 24 makes one orbit around column 12. Engagement between ratchet wheel 38 and arm 39 during orbital movement of spool 24 in the direction of arrow 14 thus causes ratchet wheel 38 to be advanced incrementally in the rotational direction of arrow 38a (see FIG. 2) so as to advance a next incremental length of wire 10 from supply spool 22. Spool 24 is prevented from rotating in a direction opposite to arrow 38a (i.e., to thereby maintain ratchet wheel 38 in its incrementally advanced position) by means of a spring-biased pawl 38b which sequentially engages the teeth of ratchet wheel 38 each time the latter is incrementally rotatably advanced. In this manner, the device 20 is capable of incrementally advancing lengths of wire 10 from the supply spool 22 to the take-up spool 24 once per cutting cycle so as to continually supply "fresh" lengths of wire 10 to the actual cutting area. However, those in this art will immediately recognize that equivalent structures could be provided so that wire replenishment occurs at any periodic interval during orbital movement of take-up spool 24 (e.g., at intervals greater or lesser than once per cutting cycle).

Supply spool 22 is supported by means of support yolk 40 for reciprocal rotational movements (arrow 42) about shaft 44 so as to permit cutting wire 10 to be wound thereupon and unwound therefrom (as will be described in greater detail below) during orbital movement of spool 24.

A wire cleaning arm 46 carrying a wire cleaning member 48 (of any suitable synthetic plastic or metal material) in wiping contact with wire 10 is also provided in operative association with spool 22 (but could also be associated with spool 24, if desired) and thus pivots with spool 22 so as to follow wire 10 during orbital movement of spool 24. Thus, as the length of the cutting wire 10 continually varies (e.g., arrows 16 and 18 as was described generally above with reference to FIG. 1), such wiping contact established between cleaning member 48 on the one hand, and wire 10 on the other hand, causes any debris remaining on the wire 10 due to the column cutting operation to be wiped therefrom.

Wire 10 is maintained under substantially constant tension during orbital movement of spool 24 by means of the structure shown in accompanying FIG. 4. As is seen, the supply spool 22 is comprised of an exterior sleeve reel 50 and an interior support reel 52. Support reel 52 is mounted to yolk 40 for rotational movements (arrow 42 in FIG. 2) via shaft 44 and is mateably engaged within sleeve reel 50. Sleeve reel 50, on the other hand, is also mounted to yolk 40 via suitable journal means (e.g., ball bearings 54) so as to be rotatable about shaft 44 in the direction of arrow 42 coaxially with support reel 52.

A compression spring 54 is coaxially positioned with respect to shaft 44 and extends between recess 56 formed in face 58 of support reel 52 and retainer cap 60 so as to exert a bias force upon reel 52 in the left hand direction as viewed in FIG. 4. This bias force exerted upon reel 52 by means of spring 54 will, in turn, urge reels 50 and 52 into frictional engagement along truncated conically-shaped engagement face 64 so that the reels 50 and 52 are capable of concurrent rotational movements coaxially about shaft 44 while yet permitting relative slippage to occur therebetween when, for example, an incremental length of wire 10 is to be unwound from reel 50 (i.e., so as to permit a "fresh" incremental length of wire 10 to be supplied to the actual cutting area in the manner described previously).

Substantially uniform tension is maintained on wire 10 during orbital movement of spool 24 by providing a torsion spring 66 within recess 68 of support reel 52. Torsion spring 66 is selected so that it exerts a rotational force on reel 52 (and thus also upon reel 50 due to the frictional engagement therebetween at face 64) which tends to wind wire 10 upon reel 50. This biased tendency provided by means of torsion spring 66 thus maintains tension upon wire 10 while yet permitting the length of wire 10 to continually vary during orbital movement of spool 24 about column 12 (i.e., permits reciprocal pivotal movements of reels 50 and 52 in the directions of arrow 42).

Rotational movement of support reel 52 is, however, limited (i.e., so that torsion spring 66 is not coiled too tight) by engagement between pin 70 (rigidly extending from face 58 of support reel 52) and stop 72 (rigidly associated with yolk 38). The relative positioning of pin 70/stop 72 is selected so that wire 10 is permitted to increase to its maximum length during orbital movement of take-up spool 24 so that torsion spring 66 is coiled to a maximum permissible extent. Any further increase in the length of wire 10 (as by the sprocket wheel 37 being incrementally advanced), however, will cause pin 70 and stop 72 to be engaged with one another so that further rotational movement of spool 22 (and hence further increase in the length of wire 10) is allowed due to the relative slippage between reels 50 and 52 at face 64 thereof.

The amount of frictional engagement between reels 50 and 52 (and hence the force required to cause relative slippage therebetween) is selected by providing suitable friction material at face 64 and/or by adjusting the bias force exerted on reel 52 by means of spring 54. Force adjustment of spring 54 is provided by threadably coupling a nut 76 onto shaft 44 so that nut 76 is operatively engaged with spring retainer cap 60 as shown in FIG. 4. Thus, when nut 76 is turned about shaft 44, such turning movement will be translated into greater/lesser force exerted by spring 54 (i.e., in dependence upon the direction of turning movement applied to nut 76).

FIG. 5 shows a simplified embodiment of a device 80 in accordance with the present invention. In the embodiment of FIG. 5, the cutting wire 10 has one end 81 fixed to movable ring 30 via connector 82 so that connector 82 (and thus end 81 of wire 10) orbitally moves along path OP as has been previously discussed. The other, free end 83 of wire 10 is guided around a pulley structure 84 and dependently supports a counterweight 86 by means of connector 88. The length $L_4$ is chosen so that it is sufficient to permit continual variance of the length of wire 10 during orbital movement of connector 82 (and thus end portion 81) during a cutting operation performed upon column 12. The counterweight 86 dependently supported by connector 88 thus maintains tension on cutting wire 10 between connector 82 and pulley 84 at all times during the cutting operation. As can be appreciated, the embodiment of device 80 in accordance with this invention is simplified in nature and, moreover, can be provided in a fairly small place.

The wire 10 may simply be "draped" over pulley 84 or, alternately, may be wound upon pulley 84 any selected number of turns so that a length $L_4$ of free end 83 thereof extends from pulley 84 to permit reciprocal rectilinear movements of wire 10 during orbital movement of fixed end 81. Wire 10 and free end 83 need not, however, be unitary with one another. That is, wire 10 and free end 83 may be provided as separate structural elements, in which case, a portion of wire 10 is wound upon pulley 84 any selected number of turns (so as to permit the length of wire 10 to continually vary during orbital movement of fixed end 81 and thus achieve reciprocal rectilinear motion thereof). In such a case, free end 83 is either wound upon pulley 84 or a separate pulley-like structure (not shown) which transfers the tension force provided by means of counterweight 86 to wire 10 so that wire 10 is maintained under tension between pulley 84 and connector 82. The free end 83 thus can be embodied in a variety of flexible structural elements, e.g., wire, chain, rope, ribbon, and the like.

While the accompanying drawings have been shown and described in connection with devices 20 or 80 employing a single cutting wire 10, it is, of course, within the purview of this invention that multiple cutting wires/movable rings etc. could be provided so as to perform multiple cutting operations on column 12. Moreover, the devices 20 or 80 could be mounted on a movable slide so that the entire device (20 or 80) synchronously moves with column 12 (for example, in the direction of arrow 90 in FIG. 3). In effect, therefore, such synchronous movement of the cutting wire 10/column 12 (and hence, the plane along which the column is cut), permits the wire 10 and column 12 to be maintained in fixed-position with respect to one another. And, any suitable tensioning means (for example, pneumatic, electromagnetic and/or hydraulic mechanisms well known to those of ordinary skill in the art) which maintain tension upon wire 10 during orbital movement of take-up spool 24 may be provided.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for cutting a columnar article comprising:
   (a) at least one cutting wire;
   (b) means for orbitally moving one end of said at least one cutting wire around the columnar article to be cut while positionally maintaining the other end of said at least one cutting wire relative to the column thereby causing said at least one cutting wire to sever the columnar article along a predetermined plane established by said orbitally moving one end; and
   (c) means for rectilinearly moving said at least one cutting wire within said established plane continually during said orbital movement of said one end.

2. Apparatus as in claim 1, further comprising a supply spool for said cutting wire connected to said other end thereof and a take-up spool for said cutting wire connected to said one end thereof, and wherein said means for rectilinearly moving said cutting wire includes means for winding and unwinding said cutting wire from said supply spool in response to the orbital movement of said take-up spool relative to said column.

3. Apparatus as in claim 2, further comprising tensioning means for tensioning said cutting wire between said one and other ends thereof.

4. Apparatus as in claim 3, wherein said tensioning means is a torsion spring operatively associated with said supply spool.

5. Apparatus as in claim 4 wherein said supply spool includes a sleeve reel, a support reel, and means for urging said support reel into frictional engagement with said sleeve reel so that said support and sleeve reels are capable of concurrent rotational movements about a common axis while yet permitting relative slippage therebetween.

6. Apparatus as in claim 5, wherein said means for urging includes force adjustment means for adjusting the amount of said frictional engagement between said support and sleeve reels.

7. Apparatus as in claim 1, further comprising tensioning means for tensioning said cutting wire between said one and other ends thereof.

8. Apparatus as in claim 7, wherein said tensioning means includes a counterweight attached to said other end of said cutting wire.

9. Apparatus as in claim 1, further comprising means in wiping contact with said cutting wire for cleaning debris therefrom.

10. Apparatus as in claim 1 wherein said means for orbitally moving said one end includes:
    an orbitally movable circular guideway positioned with respect to said columnar article so as to define an orbital path of movement for said one end and establish said predetermined plane;
    a fixed-position spool to which said other end of said cutting wire is attached;
    a movable spool, operatively coupled to said circular guideway, and having said one end of said cutting wire attached thereto; and
    drive means connected to said guideway for moving said movable spool along said orbital path.

11. Apparatus as in claim 10 wherein said fixed-position spool includes means for winding and unwinding said cutting wire from a supply reel thereof in response to the orbital movement of said one end relative to said column.

12. Apparatus as in claim 10, further comprising tensioning means for maintaining tension on said cutting wire between said fixed-position and movable spools.

13. Apparatus as in claim 10, further comprising means in wiping contact with said cutting wire for cleaning debris from said cutting wire when the same is rectilinearly moved within said established plane.

14. Apparatus as in claim 10, wherein said drive means includes a driven pinion intermeshed with said guideway for orbitally moving the same.

15. Apparatus for cutting columnar articles along a predetermined plane comprising:
    a cutting wire;
    means for tensioning said cutting wire between a first location which is in a fixed-position relative to said columnar article and a second location which is orbitally movable relative to said columnar article;
    means for moving said second location along an orbital path relative to said columnar article; and
    means for continually varying the length of said cutting wire between said first and second locations during said orbital movement of said second location relative to said columnar article.

16. Apparatus as in claim 15, wherein said tensioning means includes a counterweight connected to an end of said cutting wire.

17. Apparatus as in claim 15, further comprising a cutting wire supply spool, and wherein said means for varying the length of said cutting wire includes means for unwinding said cutting wire from, and winding said cutting wire upon, said supply spool in dependence upon the orbital movement of said second location.

18. Apparatus as in claim 15, further comprising cleaning means in wiping contact with said cutting wire for cleaning debris therefrom.

19. Apparatus as in claim 15 further comprising means for incrementally advancing lengths of said cutting wire at periodic intervals from one of said first or second locations towards the other of said first or second locations.

20. Apparatus for cutting a column comprising:
a cutting wire tensioned between its end portions;
means for moving one of said end portions along at least a segment of an orbital path relative to said column so as to cut said column along a predetermined plane established by said orbital path segment; and
means for continually varying the length of said cutting wire between its said end portions during said movement of said one end portion relative to said column along said orbital path segment.

21. Apparatus as in claim 20, wherein said means for varying said cutting wire length varies said length from a length $L_1$ to a greater length $L_2$ during a first portion of said orbital path segment and, then during a second portion of said orbital path segment, returns said cutting wire length to said length $L_1$ from said length $L_2$.

22. Apparatus as in claim 21, wherein said means for varying said cutting wire length includes a supply spool around which a supply of said cutting wire is wound, said cutting wire being unwound from, and wound upon, said supply spool in response to said one end portion traversing said first and second orbital path portions, respectively.

23. Apparatus for cutting plastic columns comprising:
at least one cutting wire;
a rotatable ring-type wire guide which includes means for fastening one end portion of said cutting wire to said ring-type wire guide;
a fixed-position wire guide to which the other end portion of the cutting wire is attached;
a cutting table for supporting a plastic column to be cut and defining at least one slot therein to permit said at least one cutting wire to pass therethrough;
drive means for moving said ring-type wire guide, and thus said one end of said cutting wire, along at least a portion of an orbital path relative to said column so that said wire cuts said column along a plane established by said orbital path portion;
means for continually changing the length of said cutting wire between said one and other end portions during said orbital movement of said one end, which continually changing length causes said cutting wire to reciprocally rectilinearly move within said established plane relative to said column; and
tensioning means for uniformly tensioning said cutting wire between said one and other end portions.

24. Apparatus as in claim 23, wherein said fixed-position and rotatable wire guides include spools upon which respective end portions of the cutting wire are wound.

25. Apparatus as in claim 23, wherein said tensioning means includes a pulley around which a portion of said cutting wire is guided, and a counterweight connected to said cutting wire portion.

26. Apparatus as in claim 23, wherein said cutting table is of a height such that said column passes centrally through said rotatable wire guide.

27. Apparatus as in claim 23, further comprising a cleaning member associated with said fixed-position wire guide for cleaning said cutting wire.

28. Apparatus as in claim 23, wherein said fixed-position wire guide includes a reel having a point of contact with said cutting wire, and wherein said point of contact is located on a midplane passing through the column to be cut.

29. Apparatus as in claim 23, further comprising means for incrementally advancing a predetermined length of cutting wire between said one and other end portions thereof at periodic intervals.

30. A method of cutting columns comprising the steps of:
(a) orbitally moving one end of a cutting wire around a column to be cut while positionally maintaining the other end thereof relative to the column thereby causing said cutting wire to sever the column along a predetermined plane established by said orbitally moving one end; and
(b) rectilinearly moving said wire cutting element within said established plane continually during said orbital movement of said one end.

31. A method of cutting columns as in claim 1, wherein step (b) is practiced by winding and unwinding said cutting wire from a supply reel thereof in response to the orbital movement of said one end relative to said column.

32. A method as in claim 1 wherein step (a) is practiced by moving said one end around said column in a circular orbital path.

33. A method as in claim 1 comprising the further step of tensioning said cutting wire between said one and other ends thereof.

34. A method as in claim 1 comprising the further step of incrementally advancing a length of said cutting wire between said ends thereof at periodic intervals.

35. A method of cutting columnar articles using a cutting wire comprising:
extending said cutting wire under tension between a pair of spaced locations;
moving one of said locations about an orbital path relative to the columnar article to be cut; and
continually varying the length of said cutting wire between said pair of spaced locations during said orbital movement of said one location, whereby said columnar article is cut.

36. A method of cutting columnar articles as in claim 6, wherein said step of continually varying the length of said cutting wire is practiced by winding and unwinding said cutting wire from a supply reel thereof associated with the other location in response to the orbital movement of said one location relative to said column.

37. A method as in claim 35 wherein said step of moving said one location is practiced by moving said one location around said column in a circular orbital path.

38. A method as in claim 35 wherein said step of extending said cutting wire under tension is practiced by allowing a counterweight to exert a tensioning force on said cutting wire.

39. A method as in claim 35 comprising the further step of incrementally advancing a length of said cutting wire between said pair of spaced locations at periodic intervals.

40. A method as in claim 39, wherein said step of incrementally advancing said length of cutting wire is practiced once per orbit of said one location.

* * * * *